United States Patent Office 3,362,620
Patented Jan. 9, 1968

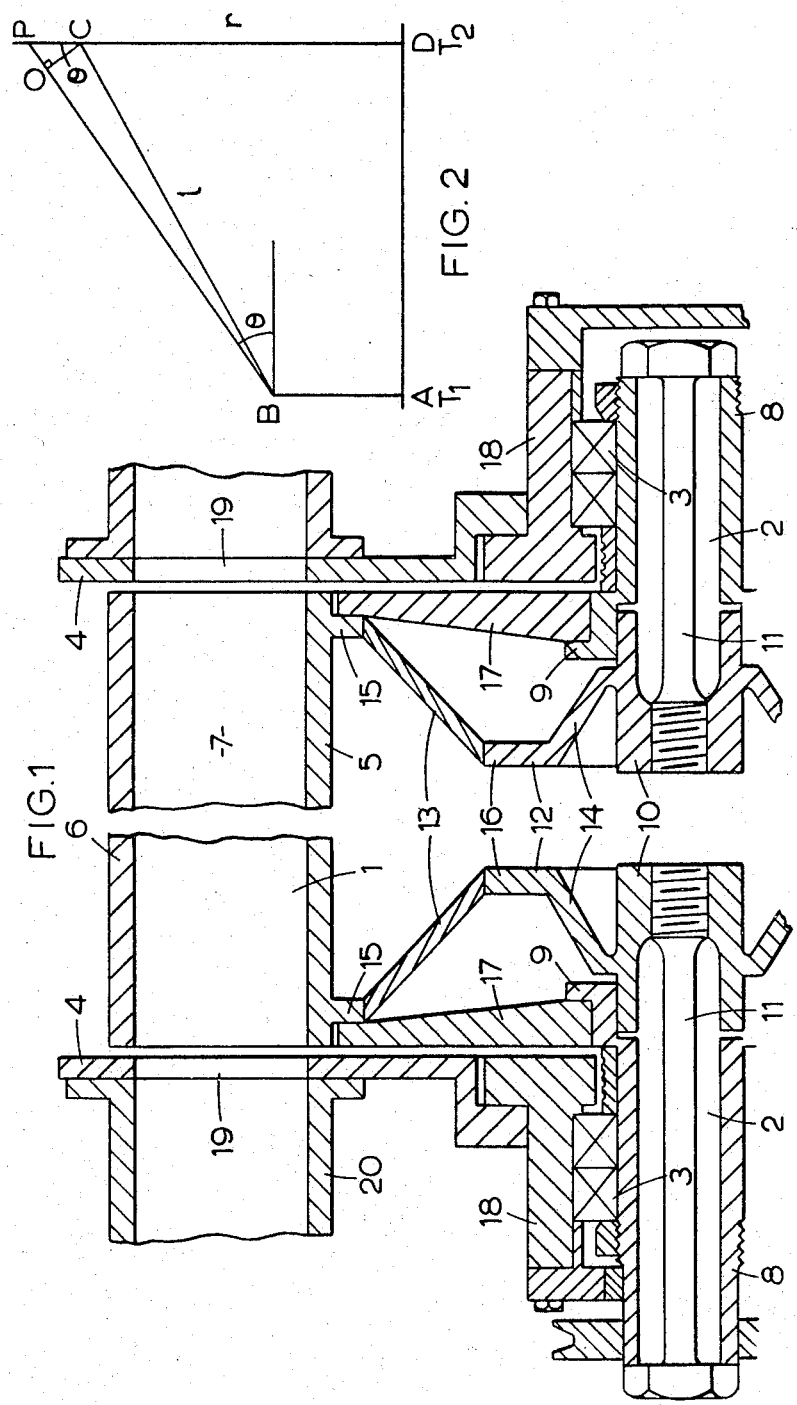

3,362,620
ROTOR
James Brown, Hampshire, and Alan George Andrews, Farnham, England, assignors to Power Jets (Research & Development) Limited, London, England, a British company
Filed Oct. 18, 1965, Ser. No. 497,225
Claims priority, application Great Britain, July 13, 1965, 29,620/65
5 Claims. (Cl. 230—69)

ABSTRACT OF THE DISCLOSURE

A rotor including a hollow body, a shaft, a bearing supporting the shaft, a frustum of a cone secured to both the hollow body and the shaft holding them co-axial of each other but permitting them to expand radially relative to each other, and means such as a disc engaging the hollow body to transmit axial movement thereof to the bearing and an end plate associated therewith while permitting relative radial movement between the hollow body and the shaft.

The present invention relates to a rotor and more particularly, but not exclusively, to a rotor for a pressure exchanger.

A pressure exchanger is herein defined as an apparatus comprising cells in which one gas quantity expands, so compressing another gas quantity with which it is in direct contact, ducting to lead gas at different pressures steadily to and from the cells and means to effect relative motion between the cells and the ducting.

One practical form of pressure exchanger comprises a rotor having a plurality of axially extending cells fixed in a ring about a shaft which is mounted for rotation between two end-plates. The cells are open at their axial ends and communicate with ducting through a port or ports formed in each end-plate to permit gases at different pressures to flow to and from the cells. To keep the leakage of gas at the ends of the cells to a minimum the clearance between each end-plate and the adjacent ends of the cells is made as small as possible consistent with free rotation of the rotor.

Keeping a uniform minimum clearance between the ends of the cells and the end-plates becomes a problem when the pressure exchanger is operating with hot gases because different parts of the pressure exchanger assume different temperatures and differential expansion of the parts occur. Thus, the cells may expand both axially and radially to different degrees from the shaft on which they are mounted and although an end-plate may be constrained through the bearing to move axially with its adjacent end of the shaft this movement may not correspond with the change in axial length of the cells so that the clearance between the ends of the cells and the adjacent end-plate may alter.

According to the present invention a rotor includes a hollow body, a shaft member supported for rotation in a bearing, means secured to both the hollow body and the shaft member to hold them co-axial of each other but to permit the hollow body to expand radially relative to the shaft member and further means engaging the hollow body to transmit axial movement thereof to the bearing while permitting radial expansion of the hollow body.

The invention will now be described by way of example, reference being made to the accompanying drawings in which:

FIGURE 1 shows, in axial section, a pressure exchanger having a rotor constructed according to the invention; and FIGURE 2 illustrates a principle of construction of the rotor of FIGURE 1.

The pressure exchanger has a rotor, comprising a cell ring 1 secured at each end to a stub-shaft member 2, mounted for rotation in bearings 3 carried in end-plates 4.

The cell ring 1 is formed by an inner tubular member 5 and an outer tubular member 6, the annular space between the members 5, 6 being sub-divided by a plurality of generally radial, angularly spaced walls 7 into a plurality of open-ended cells. Each stub-shaft member 2 is formed of a first tubular part 8 having an enlarged portion 9 into which a second tubular part 10 is a sliding fit. The two tubular parts 8, 10 are held together in axial alignment by a through-bolt 11 in screw-threaded engagement with the tubular part 10.

Each stub-shaft member 2 is secured to the adjacent end of the cell ring 1 by a flexible structure 12 comprising a pair of generally frusto-conically shaped elements 13 and 14. The element 13 is welded around one end to a rib 15 extending inwardly of the tubular member 5 and around its other end to a flange 16 formed at one end of the element 14. The other end of the element 14 is formed integrally with the tubular part 10 of the stub-shaft member 2. The structure 12 maintains the stub-shaft member 2 and the cell ring 1 co-axial but permits them to expand both radially and axially relative to each other. A disc 17 is secured to the enlarged portion 9 of the tubular part 8 and when the tubular parts 8, 10 are held together by means of the bolt 11 a peripheral portion of one face of the disc 17 is in contact with the rib 15. The diameter of the disc 17 is made smaller than the internal diameter of the member 5 so that the disc 17 is free to expand radially without its peripheral surface coming into contact with the inner surface of the member 5.

The tubular part 8 of the stub-shaft member 2 is mounted in the bearing 3 which is disposed within a housing 18. The bearing 3 constrains the tubular part 8 and the housing 18 to move axially together. The end-plate 4 is secured to the housing 18 and is formed with ports 19 (only one of which is shown) through which the cells of the cell ring 1 communicate with ducting 20.

On assembly the bolt 11 is tensioned to a pretermined degree so that the disc 17 will be held firmly in contact with the rib 15 of the member 5 under all transient and operating conditions. For this purpose the dimensions, and in particular the length, of the bolt 11 as well as the material from which it is made are selected so that it will withstand the range of stresses to which it may be subjected.

When the pressure exchanger is operating with hot gases the cell ring 1 assumes a temperature higher than the stub-shaft members 2 and consequently expands more radially. At each end of the cell ring the structure 12 permits this relative expansion between the cell ring 1 and the stub-shaft member 2 to occur while holding them co-axial. The disc 17 slides on the rib 15 on the inner member 5 and thus does not restrict the radial expansion of the cell ring 1. The cell ring 1 and the stub-shaft member 2 also grow axially and while absolute axial movement of an end of the cell ring would be reflected in corresponding movement of the adjacent end-plate 4 by transmission through the structure 12, the stub-shaft member 2 and the bearing 3, allowance has to be made for the expansion of the stub-shaft member 2 and the structure 12 relative to the cell ring 1. Since it is the clearance between the ends of the cells of the cell ring 1 and the opposed faces of the adjacent end-plates 4 that is required to be maintained at a minimum, the discs 17 are provided to transmit the movements of the ends of the cell ring 1 to the adjacent end-plates 4. Each disc is located as close to its associated end of the cell ring as is possible and is secured to the enlarged portion 9 of the part 8 which in turn is secured directly to the bearing 3. The expansion of the stub-shaft member 2 and the structure 12 relative to the cell ring 1 is accommodated by a change in tension in the through-bolt 11.

Preferably the frusto-conically shaped element 13 is a frustum of a hollow, right circular cone having a base of radius $r$, a slant height $l$ and a cone angle $\theta$ where $\sin \theta = \frac{1}{2} \, l/r$ such as is described and claimed in co-pending application Ser. No. 497,133. An element having these dimensions permits the cell ring 1 and the stub-shaft member 2 to expand radially relative to each other without causing a substantial change in their relative axial positions.

The principle of construction of the elements 13, 14 can best be understood from FIGURE 2 where A, B, C, D represents one half of an axial section of an element 13 having a slant height length $l$, represented by the line BC, a base of radius $r$, represented by the line CD, and a cone angle of $\theta$. The material from which the element is constructed has a coefficient of linear expansion of $\alpha$.

It is assumed that the element is initially at a temperature $T_1°$ and that the temperature of the base of the element is subsequently raised to $T_2°$ then the base of the element will be $(T_2 - T_1)°$ higher than the top of the element and the average of the temperature gradient between the base and the top will be $(T_2 - T_1)/2$.

Both $l$ and $r$ will increase in length and if CD is not to move axially the slant height of the element must take up the position BP where P is a point on the continuation of DC. Point C is joined to a point O on BP forming a right angled triangle COP. If it is assume that the increase in length of BC due to expansion is small compared with BC, the side OP of the triangle represents the increase in $l$, the side CP represents the increase in $r$ and the angle OCP is equal to the cone angle $\theta$ of the element.

Therefore
$$\sin \theta = OP/CP$$
but
$$OP = l.\alpha.(T_2 - T_1)/2$$
and
$$CP = r.\alpha.(T_2 - T_1)$$
Thus
$$\sin \theta = \frac{1}{2} \, l/r$$

If desired the element 14 can also be constructed according to the same principle.

We claim:
1. A rotor includes a hollow body, a shaft member, a bearing supporting the shaft member, means secured to both the hollow body and the shaft member holding them co-axial of each other but permitting them to expand radially relative to each other and further means engaging the hollow body to transmit axial movement thereof to the bearing while permitting relative radial expansion between the hollow body and the shaft member.

2. A rotor according to claim 1, wherein the shaft member is formed by two tubular parts and a bolt which extends axially through the parts to hold them in axial alignment, the bearing being constrained to follow axial movement of one of the parts.

3. A rotor according to claim 2, wherein the means transmitting axial movement of the hollow body comprises a disc secured to the tubular part of the shaft member to which the bearing is constrained and having a peripheral portion of one face in engagement with the hollow body.

4. A rotor according to claim 3, wherein the disc is held in engagement with the hollow body by tensioning the bolt of the shaft member.

5. A rotor according to claim 4, wherein the means holding the hollow body and the shaft member co-axial comprises a hollow frustum of a right circular cone having a base of radius $r$, a slant height $l$ and a cone angle $\theta$ where $\sin \theta = \frac{1}{3} \, l/r$, the base of the frustum being secured to the hollow body and the top of the frustum being secured to the other tubular part of the shaft member.

References Cited
UNITED STATES PATENTS

| | | | |
|---|---|---|---|
| 2,687,843 | 8/1954 | Alcock | 230—69 |
| 2,762,557 | 9/1956 | Jendrassik | 230—69 |

ROBERT M. WALKER, *Primary Examiner.*